United States Patent [19]
Kelley et al.

[11] Patent Number: 5,810,386
[45] Date of Patent: Sep. 22, 1998

[54] SEALING RING FOR VEHICLE OCCUPANT PROTECTION APPARATUS

[75] Inventors: Scott A. Kelley, Algonac; Charles A. Madurski, Troy, both of Mich.

[73] Assignee: TRW Vehicle Safety Systems Inc., Lyndhurst, Ohio

[21] Appl. No.: 686,214

[22] Filed: Jul. 23, 1996

[51] Int. Cl.⁶ ............................................. B60R 21/16
[52] U.S. Cl. ........................................ 280/728.2; 280/732
[58] Field of Search ........................... 280/728.1, 728.2, 280/731, 732

[56] References Cited

U.S. PATENT DOCUMENTS

| | | | |
|---|---|---|---|
| 4,153,273 | 5/1979 | Risko . | |
| 5,257,815 | 11/1993 | Bachelder et al. . | |
| 5,328,203 | 7/1994 | Baba et al. . | |
| 5,342,084 | 8/1994 | Rose et al. . | |
| 5,348,344 | 9/1994 | Blumenthal et al. . | |
| 5,356,175 | 10/1994 | Rose et al. . | |
| 5,409,256 | 4/1995 | Gordon et al. | 280/731 |
| 5,445,406 | 8/1995 | Jones | 280/728.2 |
| 5,458,363 | 10/1995 | Garner et al. . | |
| 5,468,012 | 11/1995 | Mihm . | |
| 5,486,019 | 1/1996 | Chevroulet et al. | 280/732 |
| 5,577,764 | 11/1996 | Webber et al. | 280/732 |

FOREIGN PATENT DOCUMENTS 2274432  7/1994  United Kingdom ................ 280/728.2

*Primary Examiner*—Eric D. Culbreth
*Attorney, Agent, or Firm*—Tarolli, Sundheim, Covell, Tummino & Szabo

[57] ABSTRACT

An air bag module (14) includes a cylindrical inflator (24), a wall structure (56), and a ring (120) extending through an opening (72) in the wall structure (56). The ring interlocks the inflator (24) with the wall structure (56) in a predetermined orientation circumferentially about a central axis (27) of the inflator (24). The ring (120) has first and second parts (160, 162) which are bonded together. The first part (160) of the ring (120) has an annular shape, and is formed of a first material. The second part (162) of the ring (120) extends circumferentially around the first part (160), and is formed of a second, harder material.

21 Claims, 6 Drawing Sheets

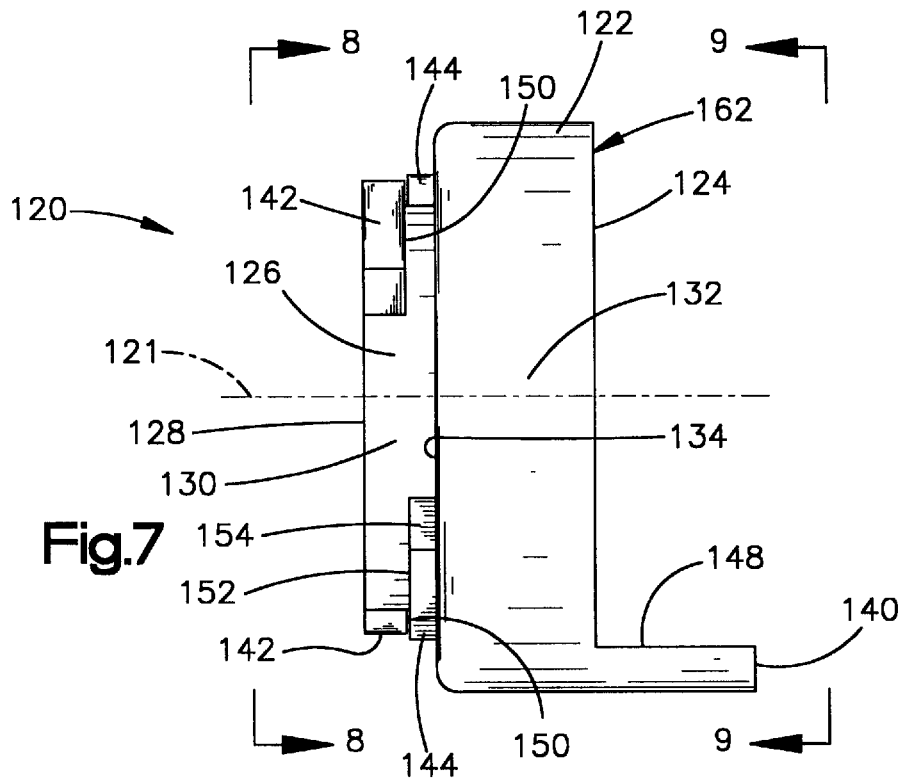
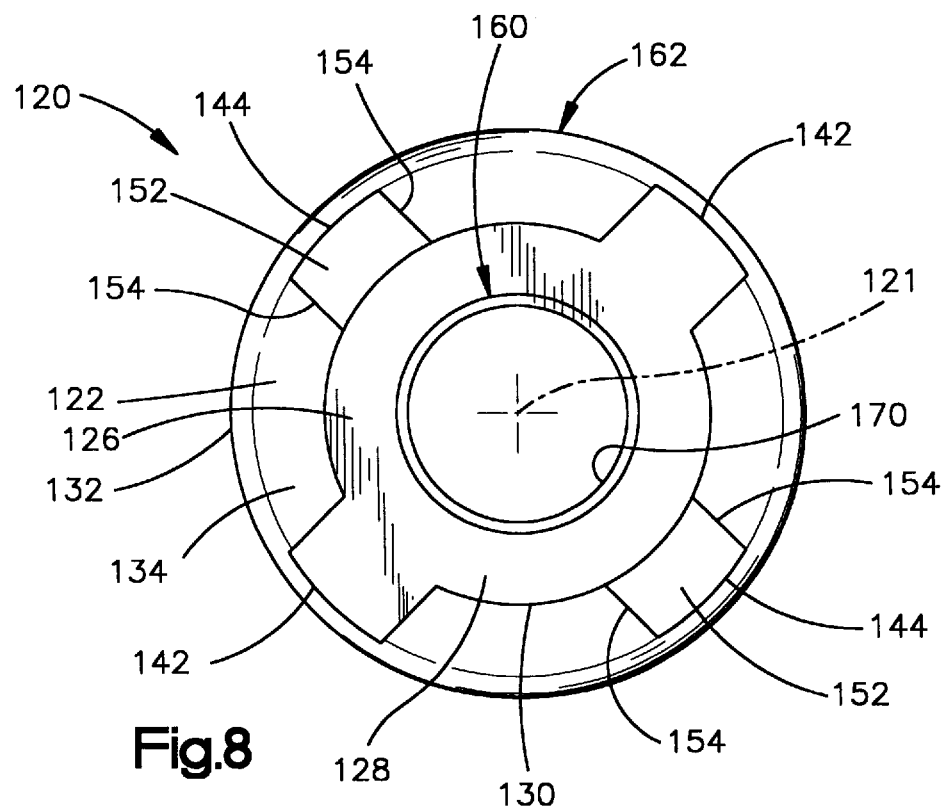

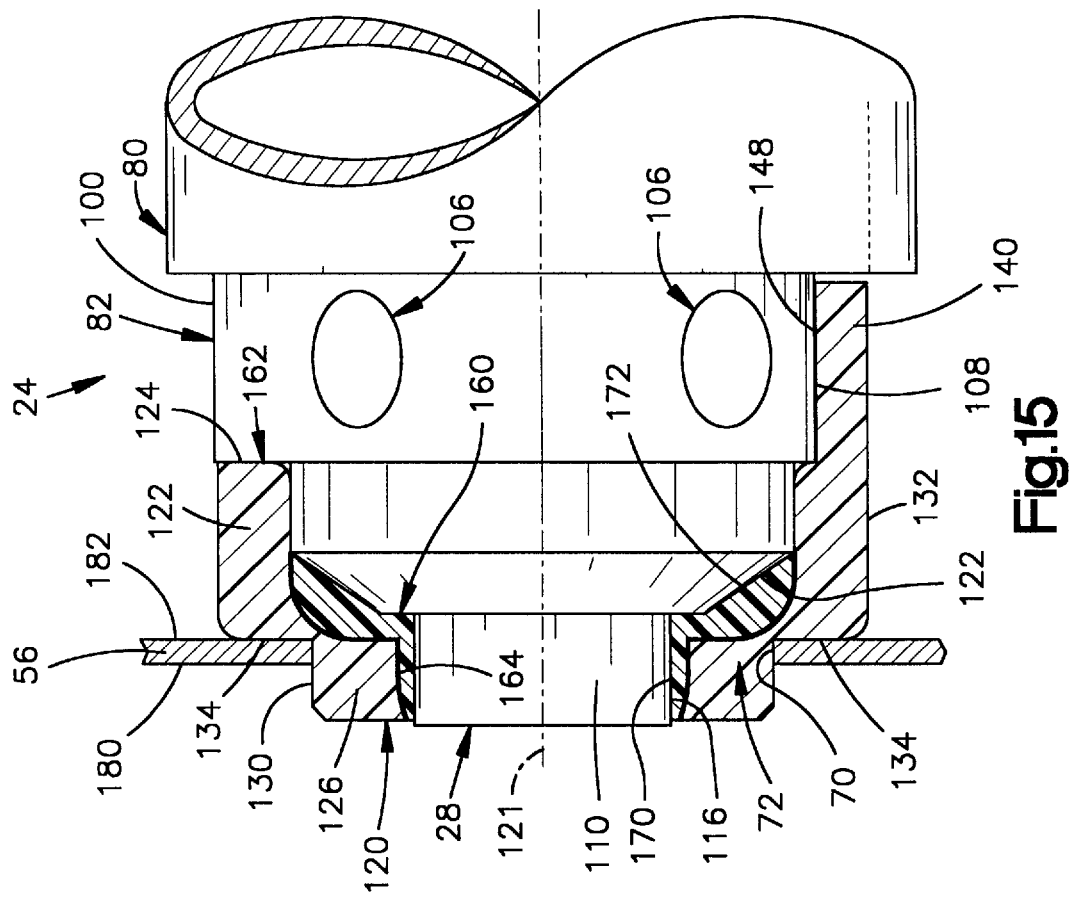
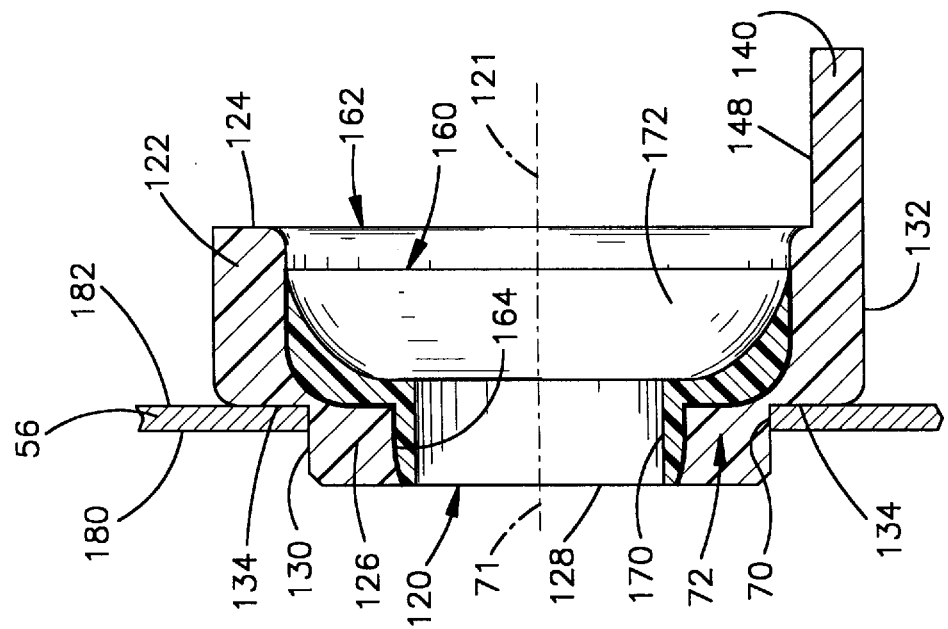

SEALING RING FOR VEHICLE OCCUPANT PROTECTION APPARATUS

FIELD OF THE INVENTION

The present invention relates to a vehicle occupant protection apparatus including an inflator and a reaction structure. The present invention particularly relates to a ring for sealing and supporting the inflator on the reaction structure.

BACKGROUND OF THE INVENTION

An inflatable vehicle occupant protection device, such as an air bag, is part of an apparatus which includes a collision sensor and an inflator. The inflator typically has an electrical initiator. When the collision sensor senses a vehicle collision having at least a predetermined threshold level of severity, electric current is directed through the initiator to actuate the inflator. The inflator then emits inflation fluid which inflates the air bag into the vehicle occupant compartment to help protect an occupant of the vehicle.

The inflator has a cylindrical shape, and the initiator is located at one end of the inflator. In addition to the air bag, the collision sensor, and the inflator, the apparatus may include a reaction structure which supports the inflator in the vehicle. The reaction structure may comprise, for example, a reaction plate upon which the inflator is mounted, or a reaction canister in which the inflator is contained. Such a reaction structure has an opening adjacent to the initiator at the end of the inflator. The opening in the reaction structure provides access to the initiator for connection of the inflator in an electrical circuit with the collision sensor.

SUMMARY OF THE INVENTION

In accordance with the present invention, an apparatus comprises a cylindrical inflator, a wall structure, and a ring. The ring extends through an opening in the wall structure, and interlocks the inflator with the wall structure in a predetermined orientation circumferentially about a central axis of the inflator. The ring has first and second parts which are bonded together. The first part of the ring has an annular shape, and is formed of a first material. The second part extends circumferentially around the first part, and is formed of a second, harder material.

In a preferred embodiment of the present invention, the first part of the ring engages the inflator to block the passage of inflation fluid through the opening between the ring and the inflator. The softer material of the first part is more suitable for this function of the ring. The second part of the ring engages the wall structure to block the passage of inflation fluid outward through the opening between the ring and the wall structure. The second part of the ring also engages the inflator to block movement of the inflator relative to the wall structure circumferentially about the axis. The harder material of the second part is more suitable for those functions of the ring.

BRIEF DESCRIPTION OF THE DRAWINGS

Further features of the present invention will become apparent to those skilled in the art to which the present invention relates from reading the following description with reference to the accompanying drawings, in which:

FIG. 7 is a side view of another part of the apparatus of FIG. 1;

FIG. 8 is a view taken on line 8—8 of FIG. 7;

FIG. 14 is a view taken on line 14—14 of FIG. 11; and

FIG. 15 is a view similar to FIG. 14 showing an additional part of the apparatus.

DESCRIPTION OF A PREFERRED EMBODIMENT

Figure 1:
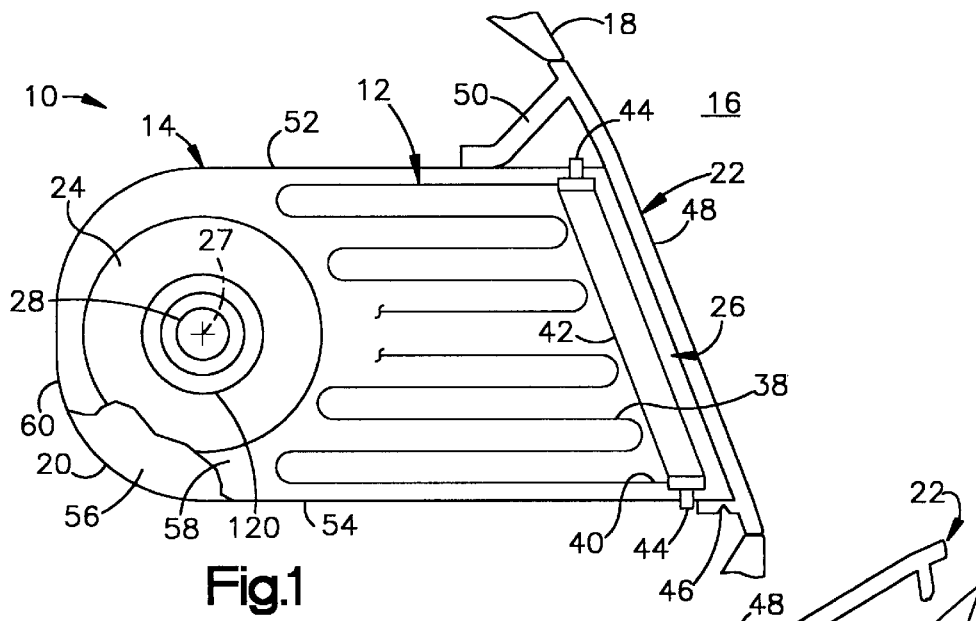
FIG. 1 is a schematic view of vehicle occupant protection apparatus comprising a preferred embodiment of the present invention.
Figure 2:
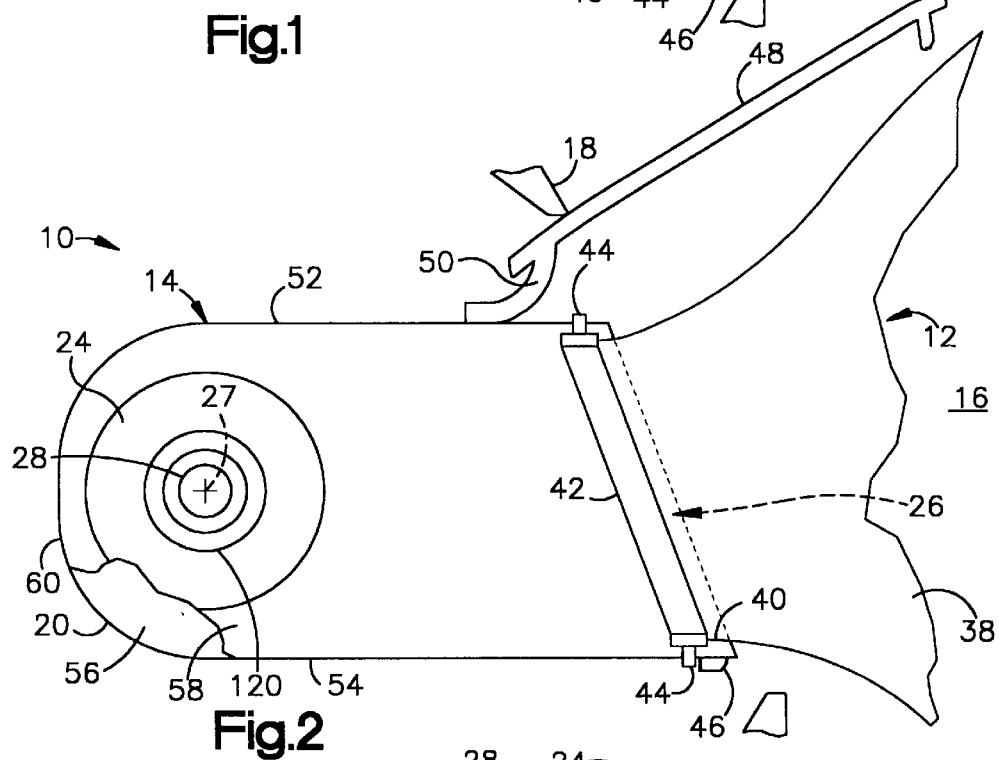
FIG. 2 is a view showing the apparatus of FIG. 1 in an actuated condition.

A vehicle occupant protection apparatus 10 comprising a preferred embodiment of the present invention is shown schematically in FIGS. 1 and 2. The apparatus 10 includes a particular type of inflatable vehicle occupant protection device 12 which is commonly referred to as an air bag. Other inflatable vehicle occupant protection devices that can be used in accordance with the present invention include inflatable seat belts, inflatable knee bolsters, inflatable head liners, and knee bolsters operated by inflatable air bags.

The air bag 12 is part of an air bag module 14 which is mounted in a vehicle at a location adjacent to the vehicle occupant compartment 16. As shown by way of example in FIGS. 1 and 2, the air bag module 14 is mounted in the instrument panel 18 at the passenger side of the vehicle. The air bag 12 is inflatable from a folded, uninflated condition, as shown fully in FIG. 1, to an unfolded, inflated condition, as shown partially in FIG. 2. When the air bag 12 is in the inflated condition, it extends from the instrument panel 18 into the vehicle occupant compartment 16 to help protect an occupant of the vehicle.

Other parts of the air bag module 14 include a reaction structure 20, a deployment door 22, and an inflator 24. The reaction structure 20 in the preferred embodiment of the present invention is a reaction canister containing the air bag 12 and the inflator 24. The deployment door 22 extends across a deployment opening 26 at the outer end of the reaction canister 20.

The inflator 24 is a cylindrical structure with a central axis 27. As known in the art, the inflator 24 comprises a source of inflation fluid for inflating the air bag 12. The inflator 24 may thus contain an ignitable gas generating material for generating a large volume of inflation gas. The inflator 24 may alternatively contain a stored quantity of pressurized inflation fluid, or a combination of pressurized inflation fluid and ignitable material for heating the inflation fluid.

Figure 3:
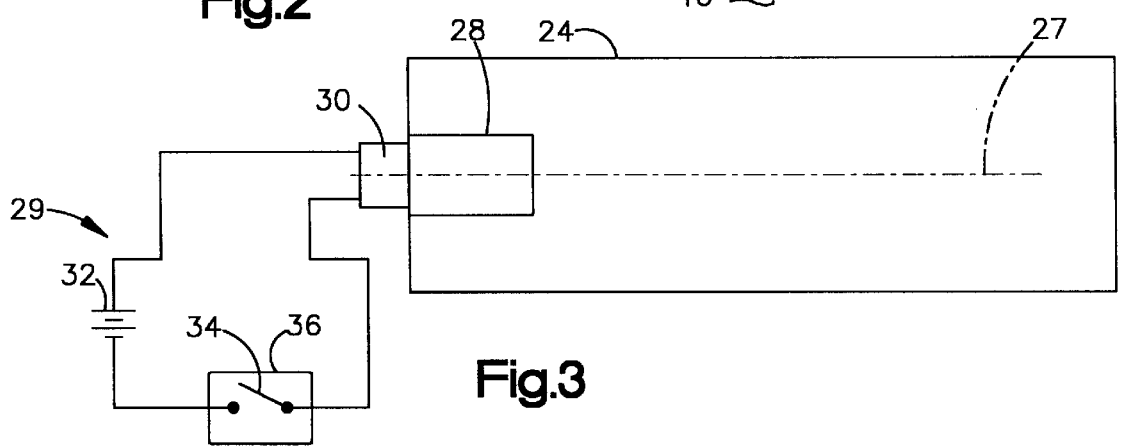
FIG. 3 is a schematic view of an electrical circuit including a part of the apparatus of FIG. 1.

As shown schematically in FIGS. 1–3, the inflator 24 includes an electrical initiator 28. The initiator 28 is located at one end of the inflator 24, and is preferably centered on the axis 27. As further shown schematically in FIG. 3, the inflator 24 is included in an electrical circuit 29.

The electrical circuit 29 includes an electrical terminal 30 which is connected directly with the initiator 28. The electrical circuit 29 further includes a power source 32, which is preferably the vehicle battery and/or a capacitor, and a normally open switch 34. The switch 34 is part of a sensor 36 which senses a condition indicating the occurrence of a vehicle collision. The collision-indicating condition may comprise, for example, sudden vehicle deceleration caused by a collision. If the collision-indicating condition is at or above a predetermined threshold level, it indicates the occurrence of a collision having at least a predetermined threshold level of severity. The threshold level of collision severity is a level at which inflation of the air bag 12 is desired to help protect an occupant of the vehicle. The switch 34 then closes and electric current is directed through the initiator 28 to actuate the inflator 24.

When the inflator 24 is actuated, it emits the inflation fluid into the reaction canister 20. The reaction canister 20 directs the inflation fluid into the air bag 12 to inflate the air bag 12 from the uninflated condition of FIG. 1 to the inflated condition of FIG. 2. A major portion 38 of the air bag 12 is then moved outward from the reaction canister 20. An inlet portion 40 of the air bag 12 is retained in the reaction canister 20 by a retainer frame 42. The retainer frame 42 is fixed to the reaction canister 20 by fasteners 44, and may have any suitable structure known in the art.

As the inflation fluid begins to inflate the air bag 12, it moves the major portion 38 of the air bag 12 outward through the deployment opening 26 and forcefully against the deployment door 22. A rupturable portion 46 of the deployment door 22 is ruptured by the force of the fluid pressure acting on the air bag 12. A panel portion 48 of the deployment door 22 is then released for pivotal movement away from the deployment opening 26. As the major portion 38 of the air bag 12 continues to move outward against the deployment door 22, it forcefully deflects a hinge portion 50 of the deployment door 22 so as to move the panel portion 48 pivotally away from the deployment opening 26. The deployment door 22 is thus opened and moved out of the path of the air bag 12 as the air bag 12 is inflated outward from the reaction canister 20 through the deployment opening 26 and into the vehicle occupant compartment 16. The structure of the deployment door 22, including the number and arrangement of rupturable portions, panel portions, and hinge portions, can vary from the example shown schematically in the drawings, as known in the art.

The reaction canister 20 preferably has upper and lower walls 52 and 54 which are planar and parallel to each other. The reaction canister 20 further has first and second opposite side walls 56 and 58 which are planar and parallel to each other. The planar walls 52, 54, 56 and 58 extend inward from the deployment opening 26 to an inner wall 60 which closes the reaction canister 20 opposite the deployment opening 26. The inner wall 60 has a contour which is complementary to the cylindrical shape of the inflator 24.

Figure 4:
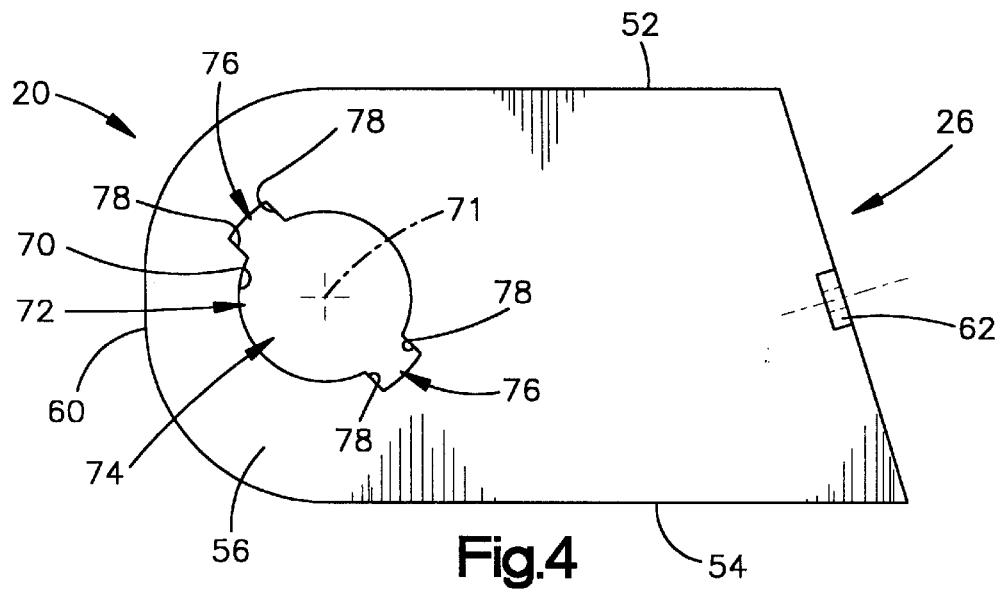
FIG. 4 is a view of a part which is shown partially in FIG. 1.

The reaction canister 20 is shown separately in the side view of FIG. 4. A pair of mounting tabs 62, one of which is visible in FIG. 4, project from the side walls 56 and 58 of the reaction canister 20. The mounting tabs 62 support the reaction canister 20 on corresponding mounting parts (not shown) of the instrument panel 18 in a known manner. Although the reaction canister 20 in the preferred embodiment of the present invention has the mounting tabs 62, any other suitable mounting structure could be used as an alternative. Moreover, the reaction canister 20 in the preferred embodiment is a separate structure which is mounted in the instrument panel 18, but such a reaction structure could alternatively be defined by the structure of the instrument panel 18, or by the structure of another part of the vehicle from which the air bag 12 is to be inflated into the vehicle occupant compartment 16.

In accordance with a particular feature of the present invention, the first side wall 56 of the reaction canister 20 has an inner edge surface 70 defining an access opening 72 (FIG. 4). A circular portion 74 of the access opening 72 is centered on an axis 71. A pair of slot-shaped portions 76 of the access opening 72 extend radially outward from the circular portion 74 at diametrically opposed locations. The access opening 72 provides access to the initiator 28 at the end of the inflator 24 for connection of the inflator 24 in the electrical circuit 29 of FIG. 3.

Figure 5:
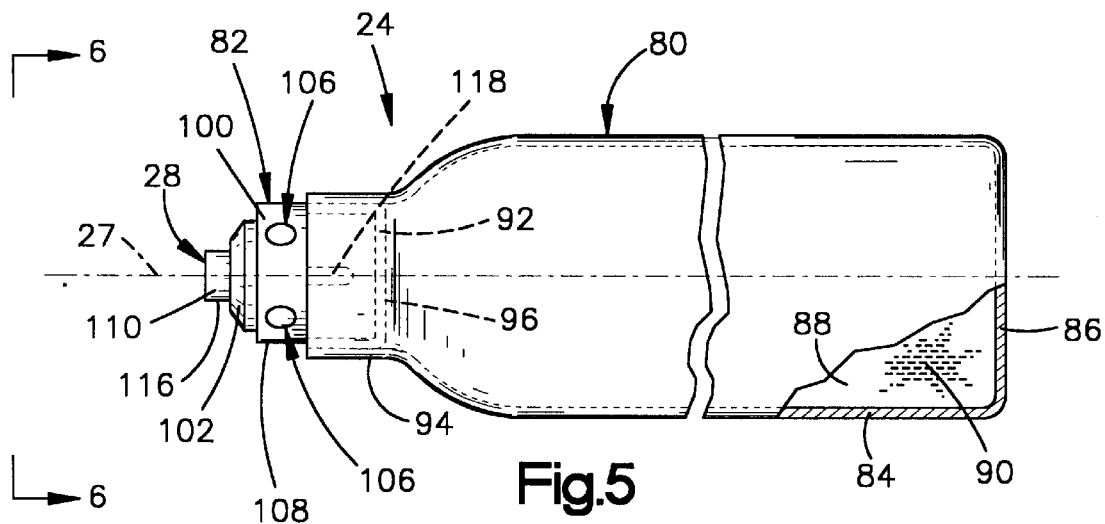
FIG. 5 is a side view of another part of the apparatus of FIG. 1.
Figure 6:
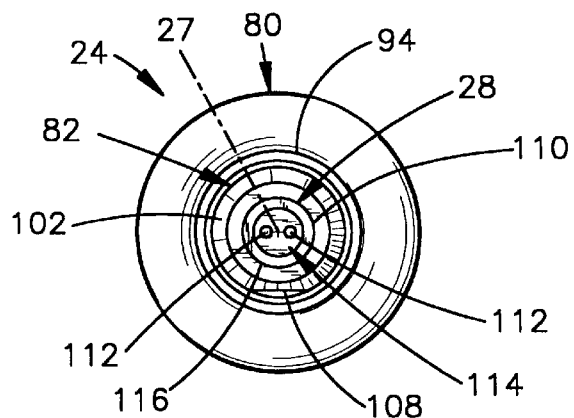
FIG. 6 is a view taken on line 6—6 of FIG. 5.
Figure 9:
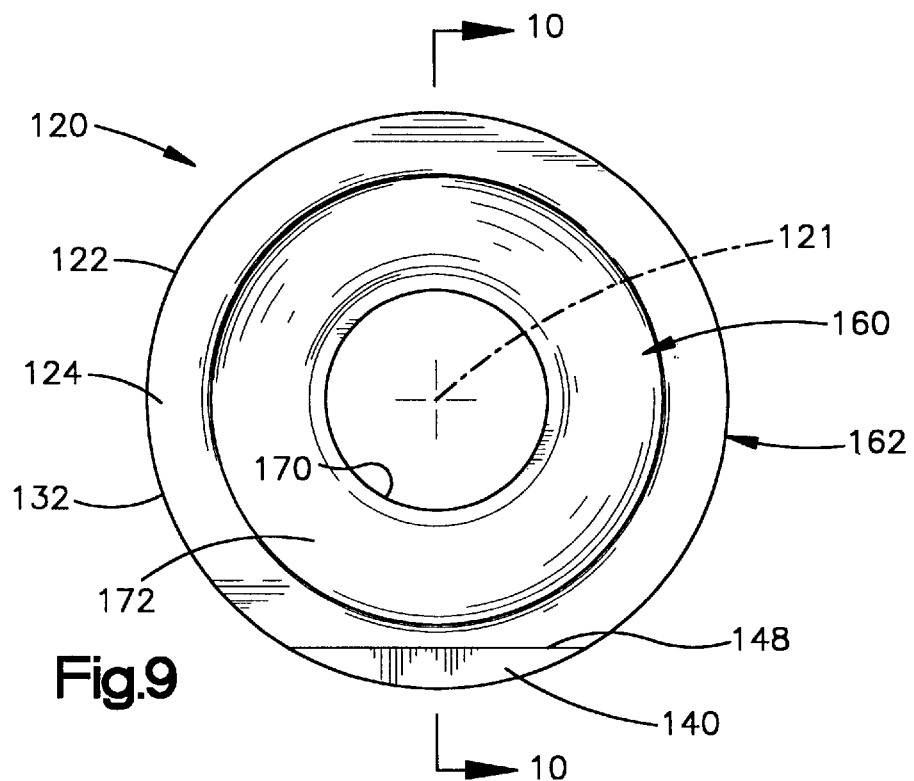
FIG. 9 is a view taken on line 9—9 of FIG. 7.

The inflator 24 is shown in greater detail in FIGS. 5 and 6. As an example of an inflator that can be used in accordance with the present invention, the inflator 12 is a pressure vessel with a known structure including a tank 80 and a manifold 82. The tank 80 has an elongated, generally cylindrical body wall 84 and a circular end wall 86, each of which is centered on the axis 27. The body wall 84 and the end wall 86 together define a storage chamber 88 containing pressurized inflation fluid 90 for inflating the air bag 12.

The inflation fluid 90 may comprise any suitable inflation fluid known in the art. Preferably, the inflation fluid comprises a combustible mixture of gases including a fuel gas, an oxidizer gas, and an inert gas in accordance with the invention set forth in U.S. Pat. No. 5,348,344, assigned to TRW Vehicle Safety Systems Inc. The combustible mixture of gases 90 is preferably contained in the storage chamber 88 at a storage pressure within the range of approximately 1500 psi to approximately 5000 psi.

The manifold 82 also has a generally cylindrical shape centered on the axis 27. An inner end portion 92 of the manifold 82 extends partially into a tapered neck portion 94 of the tank 80. The manifold 82 is fixed and sealed to the neck portion 94 of the tank 80 in a known manner, and thus closes the storage chamber 88. More specifically, the inner end portion 92 of the manifold 82 includes a closure wall 96 (shown schematically) which faces axially inward of the storage chamber 88. The closure wall 96 is rupturable to provide an outlet through which the inflation fluid 90 can flow outward from the storage chamber 88.

An outer end portion 100 of the manifold 82 includes a retainer wall 102 which is crimped against the initiator 28 to retain the initiator 28 in a position centered on the axis 27. The retainer wall 102 has a frusto-conical shape which is tapered radially outward from the initiator 28 toward the tank 80. The outer end portion 100 of the manifold 82 further has a circumferentially extending array of inflation fluid outlet openings 106. A flat surface 108 of the outer end portion faces away from the manifold 82 in a direction perpendicular to the axis 27.

As best shown in the end view of FIG. 6, the initiator 28 in the preferred embodiment of the present invention is a conventional squib with a cylindrical casing 110 and a pair of axially projecting electrode pins 112. A small charge of pyrotechnic material (not shown) is contained in the casing 110. The pyrotechnic material may have any suitable composition known in the art, and is ignited upon the passage of electric current through the initiator 28 between the electrode pins 112. The electrode pins 112 are exposed in a socket 114 defined by an outer end portion 116 of the casing 110. Alternatively, the electrode pins 112 could project axially outward beyond the end portion 116 of the casing 110, depending upon the structure of the particular electrical terminal 30 (FIG. 3) that is used to engage the electrode pins 112 for connection of the inflator 24 in the electrical circuit 29.

When the pyrotechnic material in the initiator 28 is ignited, it produces combustion products including heat, hot particles and hot gases. The combustion products emerge from the casing 110 and develop a thrust which propels a piston 118 (FIG. 5) forcefully against and through the closure wall 96 to open the storage chamber 88. Such a piston also is known in the art. Additionally, the combustion products are spewed into the storage chamber 88 to ignite the fuel gas in the mixture of gases 90. The heat generated by combustion of the fuel gas increases the fluid pressure in the storage chamber 88. The mixture of gases 90 then flows from the storage chamber 88 to the outlet openings 106 at elevated flow rates which result, in part, from the increased pressure attained upon combustion of the fuel gas. As described in the '344 patent noted above, the fuel gas is substantially consumed by combustion so that the air bag 12 is inflated by inflation gas which consists essentially of the inert gas and any remaining oxidizer gas.

The air bag module 14 (FIGS. 1 and 2) further includes a ring 120. As shown separately in FIGS. 7–10, the ring 120 has a central axis 121. A major body portion 122 of the ring 120 has an annular shape centered on the axis 121. The major body portion 122 defines a planar inner side surface 124 of the ring 120. A minor body portion 126 of the ring 120 also has an annular shape centered on the axis 121. The minor body portion 126 defines a planar outer side surface 128 of the ring 120.

The minor body portion 126 of the ring 120 further has a short, cylindrical surface 130 with a diameter that is equal to, or just slightly less than, the diameter of the circular portion 74 of the access opening 72 (FIG. 4) in the reaction canister 20. The major body portion 122 has a somewhat longer cylindrical surface 132 with a substantially greater diameter. A planar, annular surface 134 of the major body portion 122 extends radially between the cylindrical surfaces 130 and 132. The planar surface 134 faces axially outward, i.e., in a direction from right to left in FIG. 7.

The ring 120 further has an inner locking tab 140, a pair of outer locking tabs 142, and a pair of locking keys 144. The inner locking tab 140 projects axially from the inner side surface 124 of the major body portion 122. A flat surface 148 of the inner locking tab 140 faces upward, as viewed in the drawings, across the ring 120 in a direction perpendicular to the axis 121.

The outer locking tabs 142 project radially from the cylindrical surface 130 of the minor body portion 126. The outer locking tabs 142 are diametrically opposed across the axis 121, and are equally spaced from the major body portion 122 along the axis 121. Each outer locking tab 142 has a planar inner side surface 150 facing axially toward the planar surface 134 on the major body portion 122.

The locking keys 144 also project radially from the cylindrical surface 130 at diametrically opposed locations. However, the locking keys 144 are circumferentially offset from the locking tabs 142 90° about the axis 121, and adjoin the major body portion 122 at the planar surface 134. Each locking key 144 has planar outer side surface 152 and a pair of circumferentially opposite edge surfaces 154.

Figure 10:
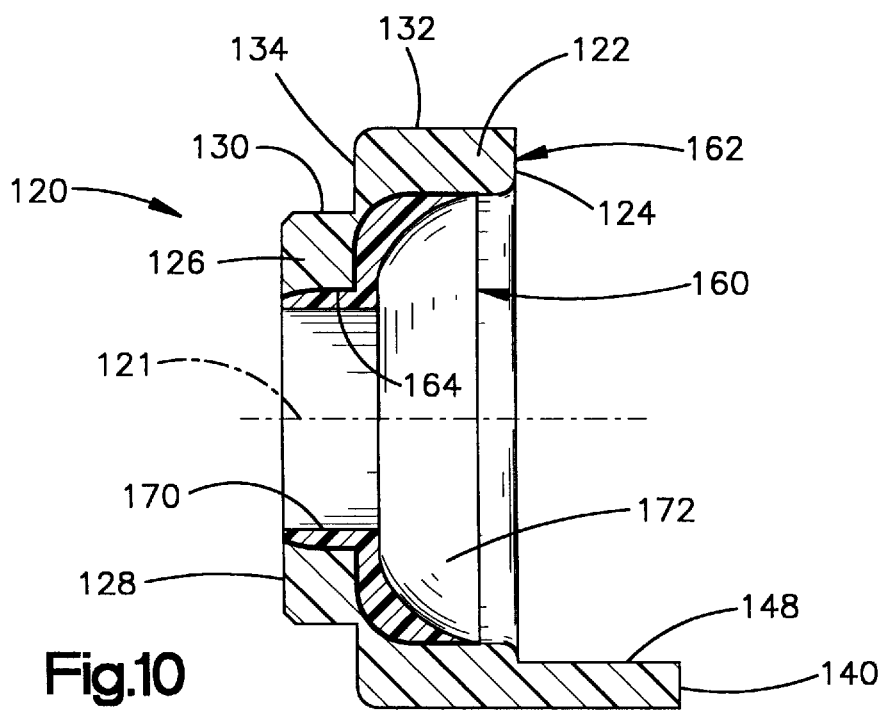
FIG. 10 is a view taken on line 10—10 of FIG. 9.

As best shown in FIG. 10, the ring 120 has first and second parts 160 and 162 which are fixed to each other. The first part 160 of the ring 120 is formed of a first material having a first durometer hardness. The second part 162 of the ring 120 is formed of a second material have a second, greater durometer hardness. In the preferred embodiment of the present invention, the first and second materials are both plastic materials, and the first and second parts 160 and 162 are fixed to each other by a bond 164. The bond 164 is preferably formed in a mold cavity upon formation of one of the parts 160 and 162 adjacent to the other. The bond 164 could alternatively be formed by the use of an adhesive.

Other preferred materials for the second part 162 of the ring 120 include silicon and metal materials, with aluminum, aluminum alloy, and sintered metal materials being most preferable. The first part 160 of the ring 120 could alternatively be formed of an elastomeric material. In each case, the first material is preferred to be more resilient than the second material. Any suitable bonding or other fastening means can be used to interconnect parts formed of these alternative materials.

The first part 160 of the ring 120 has an annular shape which, in radial cross-section, is uniform circumferentially entirely around the axis 121. A cylindrical inner surface 170 of the first part 160 has a constant diameter which is equal to, or just slightly greater than, the diameter of the outer end portion 116 (FIG. 5) of the initiator casing 110. A semispherical inner surface 172 of the first part 160 extends radially outward and axially inward from the cylindrical inner surface 170 toward the planar inner side surface 124. The tapered inner surface 172 thus has a shape which is complementary to the shape of the retainer wall 102 (FIG. 5) on the manifold 82.

The second part 162 of the ring 120 extends circumferentially around the first part 160. The inner locking tab 140, the outer locking tabs 142, and the locking keys 144 are all portions of the second part 162 of the ring 120.

When the air bag module 14 is being assembled, the ring 120 is installed in the access opening 72 (FIG. 4) in the side wall 56 of the reaction canister 20. The minor body portion 126 of the ring 120 is first moved coaxially outward through the circular portion 74 of the access opening 72. The outer locking tabs 142 are simultaneously moved outward through the slots 76. The ring 120 is then rotated 90° about the axis 71 of the opening 72. The ring 120 is thus moved to the fully installed position in which it is shown in FIGS. 11–14.

When the ring 120 is being rotated about the axis 71, the locking tabs 142 are moved circumferentially away from the slots 76. The inner side surfaces 150 on the locking tabs 142 then slide along an outer side surface 180 of the wall 56. The locking keys 144 are simultaneously moved circumferentially toward the slots 76, with their outer side surfaces 152 sliding against an inner side surface 182 (FIGS. 12–14) of the wall 56. Accordingly, when the ring 120 is being rotated, the wall 56 is engaged between the locking tabs 142 and the locking keys 144. The ring 120 deflects slightly at the locking tabs 142 and/or the locking keys 144 to enable the wall 56 to fit therebetween.

Figure 11:
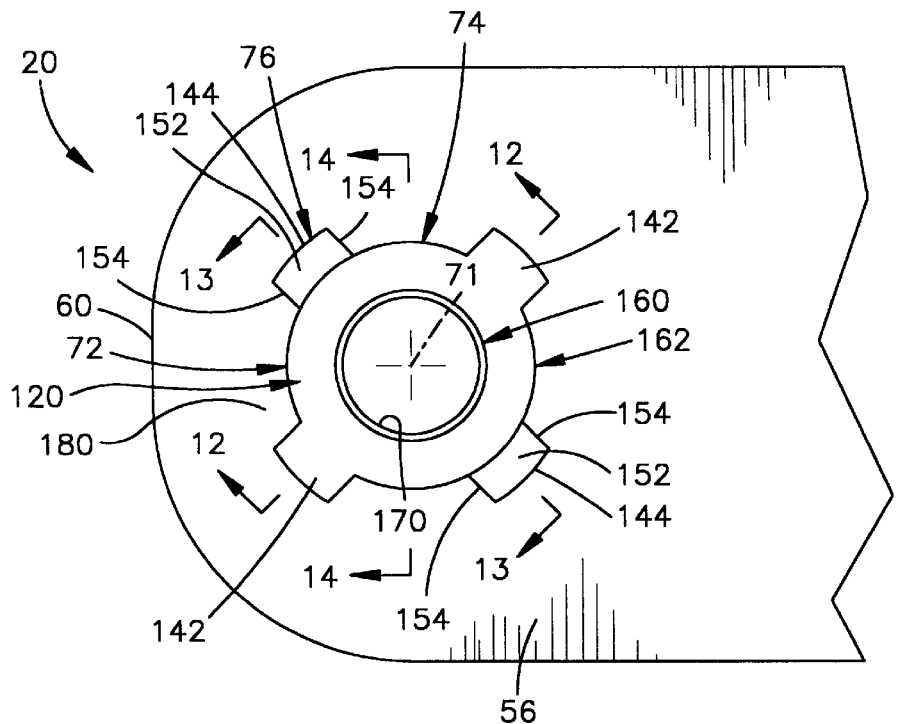
FIG. 11 is a view showing the parts of FIGS. 4 and 7–10 in an interconnected relationship.
Figure 12:
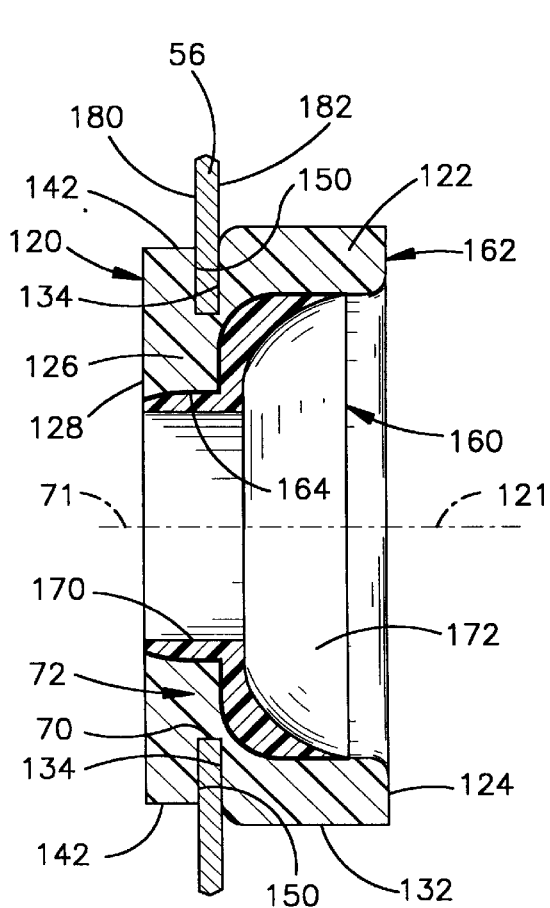
FIG. 12 is a view taken on line 12—12 of FIG. 11.
Figure 13:
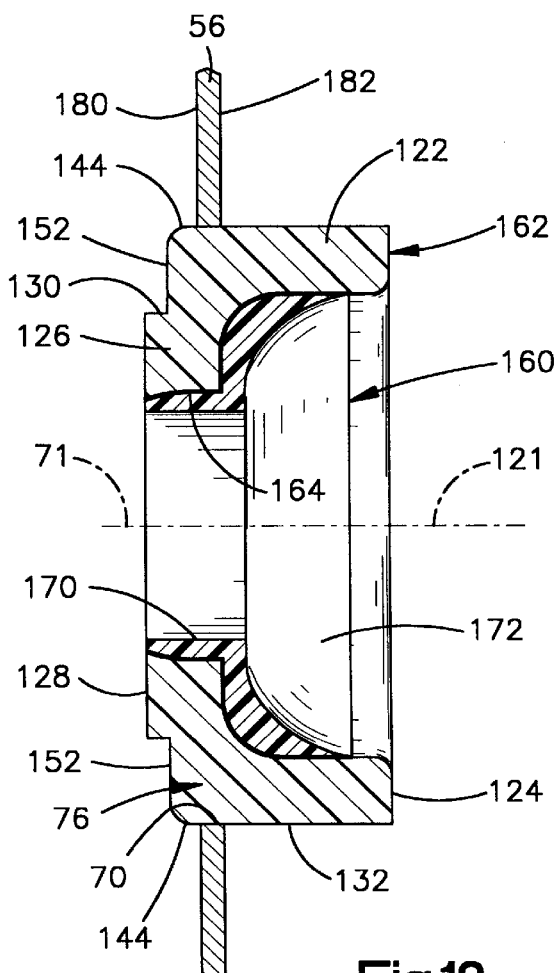
FIG. 13 is a view taken on line 13—13 of FIG. 11.

The ring 120 reaches the position of FIG. 11 upon completion of 90° of rotation about the axis 71. As the ring 120 approaches the position of FIG. 11, the locking keys 144 move circumferentially across the slots 76, and then snap axially outward through the slots 76. The opposite edge surfaces 154 on the locking keys 144 abut the edge surfaces 78 (FIG. 4) of the wall 56 at the opposite sides of the slots 76 to block further rotation of the ring 120 relative to the wall 56. The inner side surfaces 150 of the locking tabs 142 and the planar surface 134 of the ring 120 abut the opposite side surfaces 180 and 182 of the wall 56, respectively, to block axial movement of the ring 120 relative to the wall 56. Preferably, some of the deflection, and a corresponding amount of stress, remains in the ring 120 when the locking keys 144 snap outward through the slots 76. This helps to press the abutting surfaces of the ring 120 and the wall 56 firmly together in hermetic sealing contact. All of the abutting surfaces of the ring 120 and the wall 56 together establish a hermetic seal which blocks the passage of inflation fluid outward through the access opening 72 between the ring 120 and the wall 56.

When the ring 120 has been installed in the access opening 72 in the foregoing manner, the inflator 24 is installed within the ring 120, as shown in FIG. 15. The outer end portion 116 of the initiator casing 110 is received coaxially through the first part 160 of the ring 120. The outer end portion 116 then fits closely against the cylindrical inner surface 170 of the first part 160. The retainer wall 102 on the manifold 82 fits closely against the tapered inner surface 172 of the first part 160. The relatively soft, more resilient material of the first part 160 deflects at the tapered inner surface 172 to conform to the contour of the retainer wall 102, and thereby to take up radial and axial manufacturing tolerances at the retainer wall 102 to prevent rattle. As a result, the first part 160 of the ring 120 engages the inflator 24 closely and firmly enough to establish a hermetic seal which blocks the passage of inflation fluid outward through the access opening 72 between the inflator 24 and the ring 120. Additionally, the flat surface 148 on the inner locking tab 140 abuts the flat surface 108 on the manifold 82 to block movement of the inflator 24 circumferentially about the axis 27 relative to the ring 120. In this manner, the ring 120 interlocks the inflator 24 with the side wall 56 of the reaction canister 20 in a predetermined orientation circumferentially about the axis 27.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a cylindrical inflator having a central axis;

a wall structure; and a ring extending through an opening in said wall structure; said ring interlocking said inflator with said wall structure in a predetermined orientation circumferentially about said axis;

said ring having first and second parts which are bonded together, said first part having an annular shape and being formed of a first material, said second part extending circumferentially around said first part and being formed of a second, harder material;

said first part of said ring blocking the passage of inflation fluid through said opening between said ring and said inflator, said second part of said ring blocking the passage of inflation fluid through said opening between said ring and said wall structure;

said annular shape of said first part of said ring having a radial cross-section which is uniform circumferentially entirely around said first part.

2. Apparatus comprising:

a cylindrical inflator having a central axis;

a wall structure; and a ring extending through an opening in said wall structure, said ring interlocking said inflator with said wall structure in a predetermined orientation circumferentially about said axis;

said ring having first and second parts which are bonded together, said first part having an annular shape and being formed of a first material, said second part extending circumferentially around said first part and being formed of a second, harder material;

said first part of said ring blocking the passage of inflation fluid through said opening between said ring and said inflator, said second part of said ring blocking the passage of inflation fluid through said opening between said ring and said wall structure;

said second part of said ring engaging both said inflator and said wall structure to block movement of said inflator relative to said wall structure circumferentially about said axis;

said first and second parts of said ring together defining an annular body portion of said ring, said second part defining a locking tab projecting axially from said body portion, said locking tab having a flat surface abutting a corresponding flat surface on said inflator.

3. Apparatus as defined in claim 2 wherein said second part of said ring further defines a locking key, said locking key having a pair of circumferentially opposite edge surfaces abutting a corresponding pair of opposed edge surfaces of said wall structure.

4. Apparatus as defined in claim 3 wherein said wall structure has oppositely facing inner and outer side surfaces, said second part of said ring defining an additional locking tab projecting radially outward from said body portion, said additional locking tab having an inner side surface abutting said outer side surface of said wall structure.

5. Apparatus comprising:

a cylindrical inflator having a central axis;

a wall structure having an opening with a circular portion and a slot-shaped portion projecting radially from said circular portion, said wall structure further having oppositely facing inner and outer side surfaces; and a ring interlocking said inflator with said wall structure in a predetermined orientation circumferentially about said axis;

said ring having an annular body portion, a locking tab projecting radially outward from said annular body portion, and a locking key projecting radially outward from said annular body portion at a location spaced circumferentially from said locking tab;

said locking tab being receivable axially through said slot-shaped portion of said opening upon movement of said ring to a partially installed position, said ring being rotatable from said partially installed position to a fully installed position in which an inner side surface of said locking tab abuts said outer side surface of said wall structure;

said slot-shaped portion of said opening being one of a pair of diametrically opposed slot-shaped portions of said opening, said locking tab being one of a pair of diametrically opposed locking tabs on said ring, said locking key being one of a pair of diametrically opposed locking keys on said ring;

said ring having an additional locking tab projecting axially from said annular body portion, said additional locking tab having a flat surface abutting a corresponding flat surface on said inflator.

6. Apparatus as defined in claim 5 wherein said ring has first and second parts which are bonded together, said first part having an annular shape and being formed of a first material, said second part extending circumferentially around said first part and being formed of a second, harder material, said locking tabs and said locking key being portions of said second part.

7. Apparatus as defined in claim 6 wherein said first material is elastomeric, said second material being selected from the group consisting of plastic, silicon, and metal materials.

8. Apparatus as defined in claim 6 wherein said annular shape of said first part of said ring has a radial cross-section which is uniform circumferentially entirely around said first part.

9. Apparatus comprising:

a cylindrical inflator having a central axis;

a wall structure; and a ring in an installed position extending through an opening in said wall structure;

said ring and said wall structure being configured to snap together to establish a mechanical interlock upon movement of said ring to said installed position, said interlock blocking movement of said ring both axially and circumferentially;

said ring interlocking said inflator with said wall structure in a predetermined orientation circumferentially about said axis;

said ring having first and second parts which are bonded together, said first part having an annular shape and being formed of a first material, said second part extending circumferentially around said first part and being formed of a second, harder material;

said first part of said ring blocking the passage of inflation fluid through said opening between said ring and said inflator, said second part of said ring blocking the passage of inflation fluid through said opening between said ring and said wall structure;

said second part of said ring engaging both said inflator and said wall structure to block movement of said inflator relative to said wall structure circumferentially about said axis;

said first and second parts of said ring together defining an annular body portion of said ring, said second part defining a locking tab projecting axially from said body portion, said locking tab having a flat surface abutting a corresponding flat surface on said inflator.

10. Apparatus as defined in claim 9 wherein said second part of said ring further defines a locking key, said locking key having a pair of circumferentially opposite edge surfaces abutting a corresponding pair of opposed edge surfaces of said wall structure.

11. Apparatus as defined in claim 10 wherein said wall structure has oppositely facing inner and outer side surfaces, said second part of said ring defining an additional locking tab projecting radially outward from said body portion, said additional locking tab having an inner side surface abutting said outer side surface of said wall structure.

12. Apparatus comprising:

a cylindrical inflator having a central axis;

a wall structure having an opening with a circular portion and a slot-shaped portion projecting radially from said circular portion, said wall structure further having oppositely facing inner and outer side surfaces; and a ring interlocking said inflator with said wall structure in a predetermined orientation circumferentially about said axis;

said ring having an annular body portion, a locking tab projecting radially outward from said annular body portion, and a locking key projecting radially outward from said annular body portion at a location spaced circumferentially from said locking tab;

said locking tab being receivable axially through said slot-shaped portion of said opening upon movement of said ring to a partially installed position; said ring being rotatable from said partially installed position to a fully installed position in which said locking key extends axially through said slot-shaped portion of said opening to block movement of said ring rotationally relative to said wall structure, and in which an inner side surface of said locking tab abuts said outer side surface of said wall structure to block movement of said ring axially relative to said wall structure.

13. Apparatus as defined in claim 12 wherein said slot-shaped portion of said opening is one of a pair of diametrically opposed slot-shaped portions of said opening, said locking tab being one of a pair of diametrically opposed locking tabs on said ring, said locking key being one of a pair of diametrically opposed locking keys on said ring.

14. Apparatus as defined in claim 13 wherein said ring has an additional locking tab projecting axially from said annular body portion, said additional locking tab having a flat surface abutting a corresponding flat surface on said inflator.

15. Apparatus as defined in claim 14 wherein said ring has first and second parts which are bonded together, said first part having an annular shape and being formed of a first material, said second part extending circumferentially around said first part and being formed of a second, harder material, said locking tabs and said locking key being portions of said second part.

16. Apparatus as defined in claim 15 wherein said first material is elastomeric, said second material being selected from the group consisting of plastic, silicon, and metal materials.

17. Apparatus as defined in claim 15 wherein said annular shape of said first part of said ring has a radial cross-section which is uniform circumferentially entirely around said first part.

18. Apparatus as defined in claim 12 wherein said wall structure is part of a reaction structure supporting said inflator.

19. Apparatus as defined in claim 18 wherein said reaction structure is a reaction canister containing said inflator.

20. Apparatus as defined in claim 18 wherein said opening in said wall structure is an access opening for connection of said inflator in an electrical circuit.

21. Apparatus comprising:

a cylindrical inflator having a central axis;

a wall structure; and a ring in an installed position extending through an opening in said wall structure;

said ring and said wall structure being configured to snap together to establish a mechanical interlock upon movement of said ring to said installed position, said interlock blocking movement of said ring both axially and circumferentially;

said ring interlocking said inflator with said wall structure in a predetermined orientation circumferentially about said axis;

said ring having first and second parts which are bonded together, said first part having an annular shape and being formed of a first material, said second part extending circumferentially around said first part and being formed of a second, harder material;

said first part of said ring blocking the passage of inflation fluid through said opening between said ring and said inflator, said second part of said ring blocking the passage of inflation fluid through said opening between said ring and said wall structure;

said annular shape of said first part of said ring having a radial cross-section which is uniform circumferentially entirely around said first part.

* * * * *